(12) United States Patent
Sriraman

(10) Patent No.: US 10,679,333 B2
(45) Date of Patent: Jun. 9, 2020

(54) DEFECT DETECTION, CLASSIFICATION, AND PROCESS WINDOW CONTROL USING SCANNING ELECTRON MICROSCOPE METROLOGY

(71) Applicant: KLA-TENCOR CORPORATION, Milpitas, CA (US)

(72) Inventor: Hari Pathangi Sriraman, Chennai (IN)

(73) Assignee: KLA-Tencor Corporation, Milpitas, CA (US)

( * ) Notice: Subject to any disclaimer, the term of this patent is extended or adjusted under 35 U.S.C. 154(b) by 132 days.

(21) Appl. No.: 16/046,171

(22) Filed: Jul. 26, 2018

(65) Prior Publication Data

US 2019/0287238 A1    Sep. 19, 2019

Related U.S. Application Data

(60) Provisional application No. 62/665,903, filed on May 2, 2018.

(30) Foreign Application Priority Data

Mar. 14, 2018 (IN) .............................. 201841009298

(51) Int. Cl.
| | |
|---|---|
| *G06T 7/00* | (2017.01) |
| *G06N 3/08* | (2006.01) |
| *G06K 9/62* | (2006.01) |
| *G06K 9/20* | (2006.01) |

(Continued)

(52) U.S. Cl.
CPC .......... *G06T 7/0006* (2013.01); *G06K 9/2054* (2013.01); *G06K 9/46* (2013.01); *G06K 9/6267* (2013.01); *G06N 3/08* (2013.01);

*G06N 20/00* (2019.01); *G06T 7/001* (2013.01); *G06T 2207/10061* (2013.01); *G06T 2207/20081* (2013.01); *G06T 2207/20084* (2013.01);

(Continued)

(58) Field of Classification Search
None
See application file for complete search history.

(56) References Cited

U.S. PATENT DOCUMENTS

| | | | | |
|---|---|---|---|---|
| 6,122,397 A | * | 9/2000 | Lee .......................... | G06T 7/001 382/141 |
| 6,148,099 A | * | 11/2000 | Lee ....................... | G06T 7/0006 382/145 |

(Continued)

OTHER PUBLICATIONS

Dotan, N.—"Method for enhancing topography and material contrast in automatic SEM review"—SPIE—Jun. 1999, pp. 491-498 (Year: 1999).*

(Continued)

*Primary Examiner* — Bernard Krasnic
(74) *Attorney, Agent, or Firm* — Hodgson Russ LLP

(57) ABSTRACT

A defect in an image of a semiconductor wafer can be classified as an initial defect type based on the pixels in the image. Critical dimension uniformity parameters associated with the defect type can be retrieved from an electronic data storage unit. A level of defectivity of the defect can be quantified based on the critical dimension uniformity parameters. Defects also can be classified based on critical dimension attributes, topography attributes, or contrast attributes to determine a final defect type.

11 Claims, 8 Drawing Sheets

(51) Int. Cl.
*G06K 9/46* (2006.01)
*G06N 20/00* (2019.01)

(52) U.S. Cl.
CPC .............. *G06T 2207/20224* (2013.01); *G06T 2207/30148* (2013.01)

(56) References Cited

U.S. PATENT DOCUMENTS

| | | | |
|---|---|---|---|
| 7,229,845 B1* | 6/2007 | Luu | G06Q 50/04 |
| | | | 257/E21.525 |
| 9,739,728 B1 | 8/2017 | Bedell et al. | |
| 2012/0027286 A1 | 2/2012 | Xinyu et al. | |
| 2012/0229618 A1* | 9/2012 | Urano | G01N 21/9501 |
| | | | 348/92 |
| 2014/0198975 A1 | 7/2014 | Ryo et al. | |
| 2014/0205179 A1 | 7/2014 | Li et al. | |
| 2015/0213172 A1 | 7/2015 | Luoh et al. | |
| 2016/0341791 A1* | 11/2016 | Duffy | G01R 31/307 |
| 2017/0200260 A1 | 7/2017 | Bhaskar et al. | |
| 2018/0107928 A1 | 4/2018 | Zhang et al. | |
| 2018/0293721 A1 | 10/2018 | Gupta et al. | |
| 2018/0321168 A1* | 11/2018 | Sah | H01L 22/20 |
| 2018/0330511 A1 | 11/2018 | Ha et al. | |
| 2018/0341525 A1 | 11/2018 | Gupta et al. | |
| 2019/0005357 A1* | 1/2019 | Bhaviripudi | G06N 3/0454 |
| 2019/0073568 A1 | 3/2019 | He et al. | |
| 2019/0086340 A1* | 3/2019 | Leu | G01N 21/8851 |

OTHER PUBLICATIONS

WIPO, ISR for PCT/US2019/020629, dated Jun. 14, 2019.

* cited by examiner

DEFECT DETECTION, CLASSIFICATION, AND PROCESS WINDOW CONTROL USING SCANNING ELECTRON MICROSCOPE METROLOGY

CROSS-REFERENCE TO RELATED APPLICATIONS

This application claims priority to the Indian patent application filed Mar. 14, 2018 and assigned App. No. 201841009298 and to the provisional patent application filed May 2, 2018 and assigned U.S. App. No. 62/665,903, the disclosures of which are hereby incorporated by reference.

FIELD OF THE DISCLOSURE

This disclosure relates to defect detection and classification on semiconductor wafers.

BACKGROUND OF THE DISCLOSURE

Evolution of the semiconductor manufacturing industry is placing ever greater demands on yield management and, in particular, on metrology and inspection systems. Critical dimensions continue to shrink. Economics is driving the industry to decrease the time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Defect review typically involves high resolution imaging and classification of defects that were flagged by an inspection process using either a high magnification optical system or a scanning electron microscope (SEM). Defect review is typically performed at discrete locations on specimens where defects have been detected by inspection. The higher resolution data for the defects generated by defect review is more suitable for determining attributes of the defects such as profile, roughness, or more accurate size information.

Defect review is a process by which a review tool reviews defects acquired by an inspector or inspection tool. Defect review also results in classification of defects and differentiation, or separation of defect types based on a set of calculated defect attributes. Advances in machine learning (or deep learning) methodologies have made it an attractive framework for use in defect detection and classification. While such frameworks have proven useful for defect classification and other functions, the frameworks themselves also make it difficult to know whether the machine learning framework is operating correctly. For example, in the case of defect classification, currently used approaches for performing quality assurance on a classifier include classical metrics in machine learning such as accuracy, confusion matrix, and sensitivity on an offline test dataset and an online and/or in-field evaluation. In addition, currently used approaches for performing data augmentation include having a domain expert or an algorithm expert guide the process. There are, however, a number of disadvantages for currently-used quality assurance and data augmentation methods and systems. For example, the currently-used quality assurance approaches described above cannot identify a situation in which a classifier makes a correct prediction based on wrong causal features, especially with deep learning classifiers. In another example, the currently-used quality assurance approaches described above treat machine learning algorithms as a black box. In an additional example, the currently-used approaches for performing data augmentation cannot be used to directly improve or correct a poorly-trained classifier.

Accordingly, improved defect detection and classification is needed.

BRIEF SUMMARY OF THE DISCLOSURE

A method is provided in a first embodiment. An image of a semiconductor wafer with a defect in a bounding box is received at a processor. The defect in the image is classified as an initial defect type based on pixels in the image using the processor. Critical dimension uniformity parameters associated with the defect type are retrieved from an electronic data storage unit using the processor. A level of defectivity of the defect is quantified based on the critical dimension uniformity parameters using the processor.

The method can include, using the processor, obtaining topography attributes and contrast attributes for the defect in the image, and classifying the defect based on the topography attributes and the contrast attributes as a final defect type. Properties of the defect and the final defect type can be added to a database. The properties include the topography attributes and the contrast attributes.

Classifying as the final defect type can use a machine learning algorithm. The machine learning algorithm can be trained with the final defect type and properties of the defect. The properties include, for example, a critical dimension attribute.

The defect in the image can be identified using the processor. For example, the defect can be identified using image subtraction with an image of a neighboring die on the semiconductor wafer. The bounding box can be drawn around the defect using the processor.

The image may be a scanning electron microscope image.

A non-transitory computer readable medium can store a program configured to instruct the processor to execute the method of the first embodiment.

A method is provided in a second embodiment. An image of a semiconductor wafer with a defect in a bounding box is received at a processor. An initial defect type of the defect in the image is received at the processor. Topography attributes and contrast attributes are obtained for the defect in the image using the processor. The defect is classified based on the topography attributes and the contrast attributes as a final defect type using the processor.

Properties of the defect and the final defect type can be added to a database.

Classifying as the final defect type can use a machine learning algorithm. The machine learning algorithm can be trained with the final defect type and properties of the defect. The properties include, for example, a critical dimension attribute.

The image may be a scanning electron microscope image.

A non-transitory computer readable medium can store a program configured to instruct the processor to execute the method of the second embodiment.

A system is provided in a third embodiment. The system includes a stage configured to hold a semiconductor wafer, an electron source that directs electrons at the semiconductor wafer on the stage, a detector that receives electrons from a surface of the semiconductor wafer on the stage, an electronic data storage unit, and a processor in electronic communication with the detector and the electronic data storage unit. The processor is configured to: receive an image of the semiconductor wafer with a defect in a bounding box; classify the defect in the image as an initial defect type based on the pixels in the image; retrieve critical dimension uniformity parameters associated with the defect type from the electronic data storage unit; and quantify a level of defectivity of the defect based on the critical dimension uniformity parameters.

The processor can be further configured to obtain topography attributes and contrast attributes for the defect in the image, and classify the defect based on the topography attributes and the contrast attributes as a final defect type.

The system can include a machine learning module. Classifying as the final defect type can use the machine learning algorithm module.

The processor can be further configured to identify the defect in the image.

The processor can be further configured to draw the bounding box around the defect.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Output of the critical dimension uniformity (CDU) feature on an SEM review or inspection platform can be integrated into the defect classification exercise. A metrology feature like critical dimension uniformity measures pattern fidelity indices like pattern width, length, diameter, area, angle, roughness, edge placement errors, etc. Automated defect classification platforms can classify defects automatically based on certain defect attributes or can use a neural network which has been trained to identify certain defect types.

Figure 1:
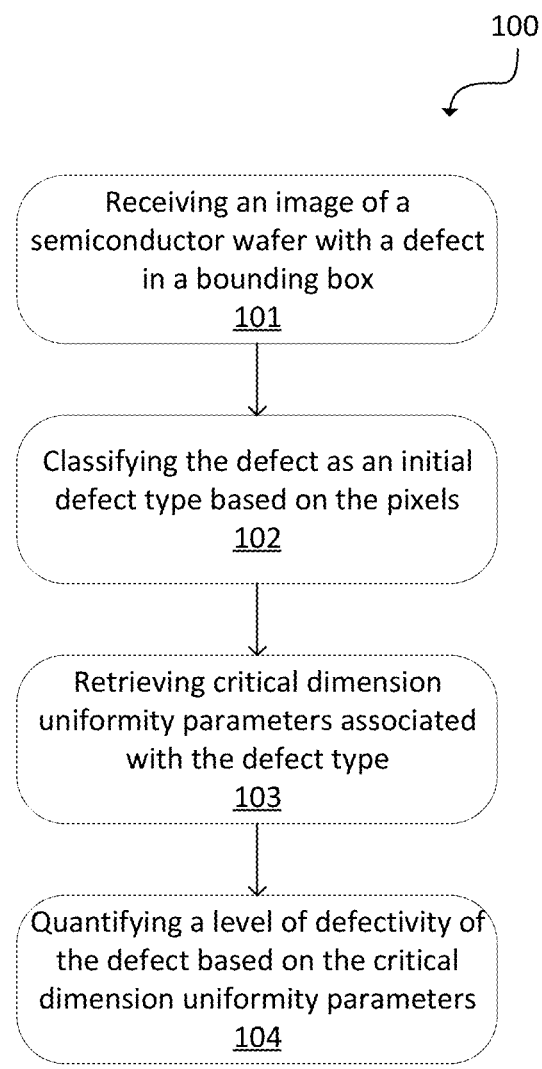
FIG. 1 is a flowchart of a method in accordance with the present disclosure.

FIG. 1 illustrates a method 100. At 101, an image of a semiconductor wafer with a defect in a bounding box is received at a processor. The image may be a scanning electron microscope image. The bounding box can be reported as a result of the defect detection flow in the review SEM by taking an image difference between reference and defective images. The bounding box also can be reported as a result of the defect detection flow by using deep learning techniques for single image detection or defect detection with respect to design.

Using the processor, the defect in the image is classified as an initial defect type based on pixels in the image at 102. Thus, attributes can be extracted from the defect and the defect can be classified based on these attributes. This can be based on a pre-trained classifier flow. Each defect type can be assigned a particular class code.

The pre-trained classifier flow can use a set of pre-defined (based on the input training data set) filters or criteria based on image and/or design attributes. New images can flow through this logic sequence. Class codes can be assigned depending on the match success of new images with the existing classification flow.

Using the processor, critical dimension uniformity parameters associated with the defect type are retrieved from an electronic data storage unit at 103. The defect class code assigned at 102 can be mapped to one or more measurement types. The measurement types can include line critical dimension (CD), trench CD, contact diameter, contact CDU, distance, roughness, or other types. The mapping can be done as a part of the recipe set-up in the tool or in the CDU platform where certain class codes are mapped to certain measurement types.

Using the processor, a level of defectivity of the defect based on the critical dimension uniformity parameters is quantified at 104. A level of defectivity can be determined by normalizing the total number of defects found on the wafer to an area of the wafer. For example, the total number of defects on the wafer can be normalized to a per $cm^2$ area on the wafer. The level of defectivity also can be quantified by associating the measured critical dimension to a severity of the defectivity. For example, by defining a good, bad, and acceptable range of critical dimension, then good, bad, and acceptable levels of defectivity can be determined.

In an example, an objective is to print a line on the wafer with a target CD of 100 nm. 100 nm±2% variation can be considered good. >±2% and <±5% can be considered acceptable. >±5% can be considered bad.

In another example, trench width can be retrieved and examined to find a bridge defect because the average trench width changes. If a bridge defect is flagged, then a trench width search may be instituted.

In another example, contact diameters can be used to quantify open and/or merged contacts. A distance between two structures can be used to quantify bridged or open circuits.

In an instance, topography attributes and contrast attributes for the defect in the image can be obtained using the processor. Topography and contrast attributes can be obtained from an image set generated by an SEM. The images with defects can have a set of pre-defined attributes that may be calculated by the SEM to determine topography and contrast attributes. The defect can be classified based on the topography attributes and the contrast attributes as a final defect type using the processor. Properties of the defect and the final defect type can be added to a database. The properties can include the topography attributes and the contrast attributes.

Classifying as the final defect type can use a machine learning algorithm. The machine learning algorithm can be trained with properties of the defect and the final defect type. The properties can include one or more critical dimension attributes. While this may include contrast and topography attributes, this also can include pattern width, length, diameter, area, angle, roughness, or edge placement errors. The critical dimension attribute can classify defects based on severity.

The defect in the image can be identified using the processor. In an example, the defect can be identified using image subtraction with an image of a neighboring die on the semiconductor wafer. The bounding box can be drawn around the defect using the processor.

Figure 2:
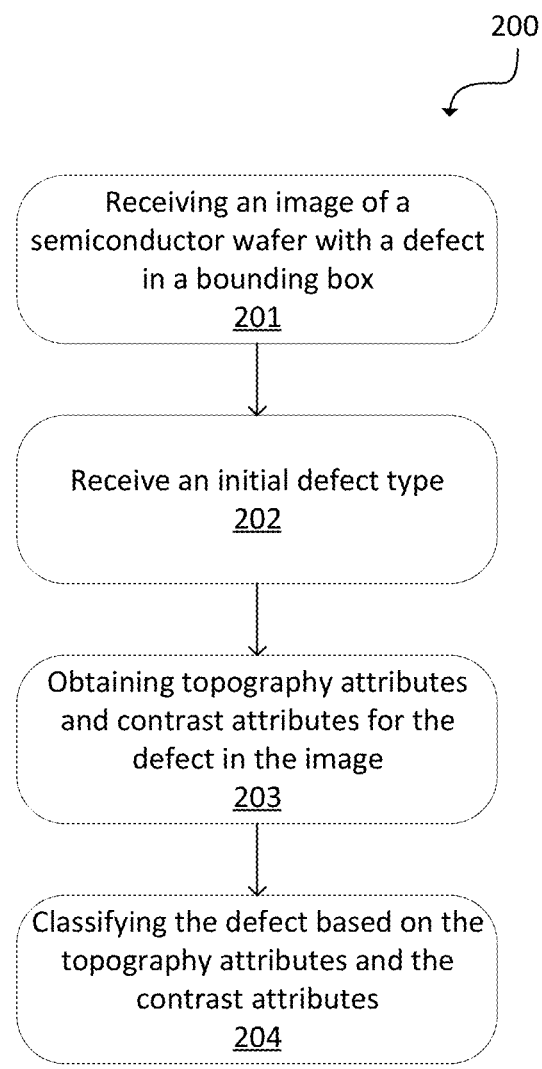
FIG. 2 is a flowchart of another method in accordance with the present disclosure.

FIG. 2 illustrates a method 200. At 201, an image of a semiconductor wafer with a defect in a bounding box is received at a processor. The image may be a scanning electron microscope image.

At 202, an initial defect type of the defect in the image is received at the processor. The initial defect type can be obtained from a pre-trained classifier flow of an SEM used for review.

Using the processor, topography attributes and contrast attributes for the defect in the image are obtained at 203. Other imaging parameters also can be obtained, such as design context, shape context, or background.

Using the processor, the defect is classified based on the topography attributes, contrast attributes, or other imaging parameters as a final defect type at 204. This can be performed using a pre-trained classifier in a machine learning flow or single image detection in deep learning techniques. The final defect type may be the same as the initial defect type. The final defect type also can be different from the initial defect type. If the final defect type and initial defect type are different, the severity of the defect classification may have changed based on the critical dimension results after critical dimension measurement because the critical dimension measurement can reveal more information than the initial classification.

Properties of the defect and the final defect type can be added to a database. The properties can include the topography attributes and the contrast attributes.

Classifying the defect as the final defect type can use a machine learning algorithm. The machine learning algorithm can be trained with properties of the defect and the final defect type.

FIGS. 3-7 illustrate exemplary hotspots on a 10 nm node representative back-end M1 layer from process window qualification (PWQ) or focus exposure matrix (FEM) wafers, where the exposure dose and focus have been modulated on specific dies. Defects are circled in dotted lines. SEM images were gathered on the PWQ and/or FEM wafers. Using an offline CDU utility, a specific pattern width was measured on several dies across the wafer. Based on the critical dimension measured on the hotspots, the patterning success on different dies can be judged based on the different failure modes like missing features, pattern breaks, bridges, etc. Such classification of patterning failure modes can be enabled by the output of the CDU feature. Hence, integrating the output of the CDU feature into the attribute space of the automatic defect classification platform will help in defect/hotspot classification based on this quantitative attribute. Such an integration of CDU and automated defect classification features can be useful in FEM, PWQ, or process window centering (PWC) applications.

Figure 3:
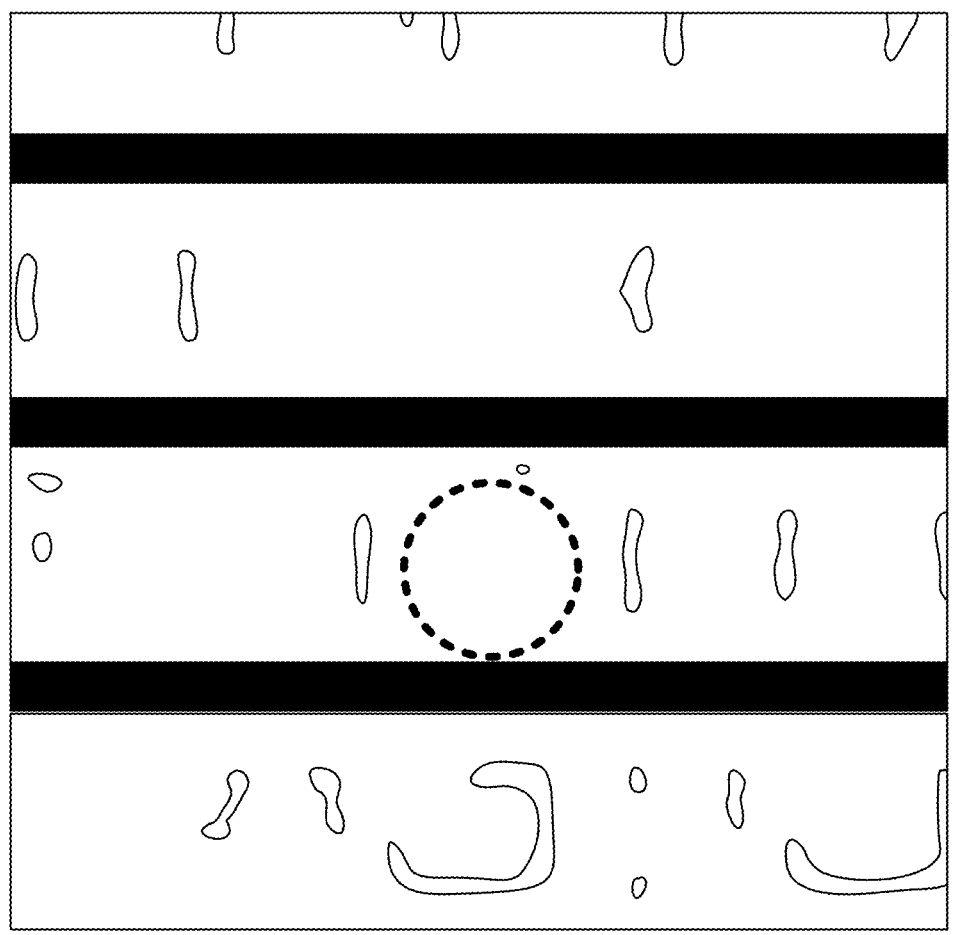
FIG. 3 is an exemplary image illustrating pattern failure

FIG. 3 is an exemplary image illustrating pattern failure. There may be missing features or blank images at the end of an FEM. In this instance, the minimum CD may be 0 nm.

Figure 4:
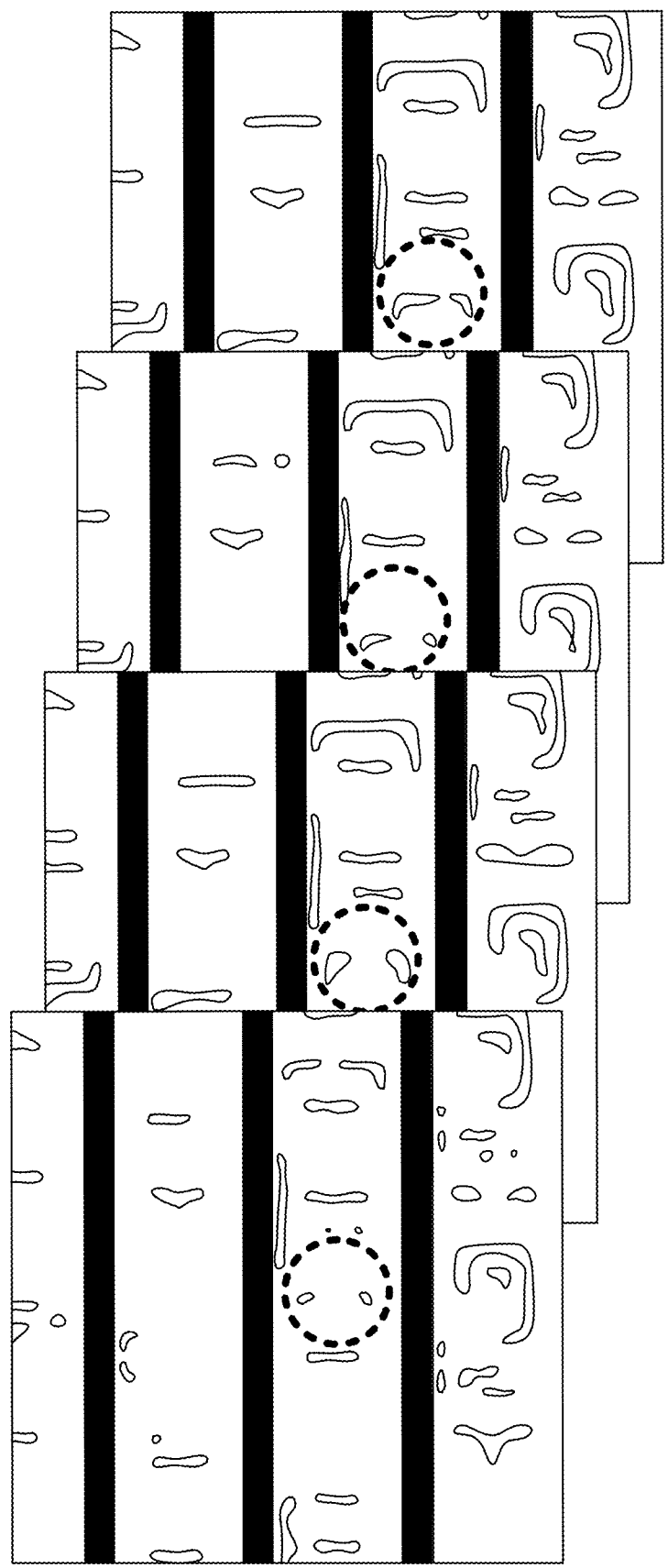
FIG. 4 includes four exemplary images illustrating pattern failure.

FIG. 4 includes four exemplary images illustrating pattern failure. If the average CD is less than 10 nm, then there may be a high propensity for pattern breaks. If the average CD is from 10 nm to 13 nm, then there may be a smaller propensity for pattern breaks. The propensity for pattern breaks may be medium or low if the average CD is from 10 nm to 13 nm.

Figure 5:
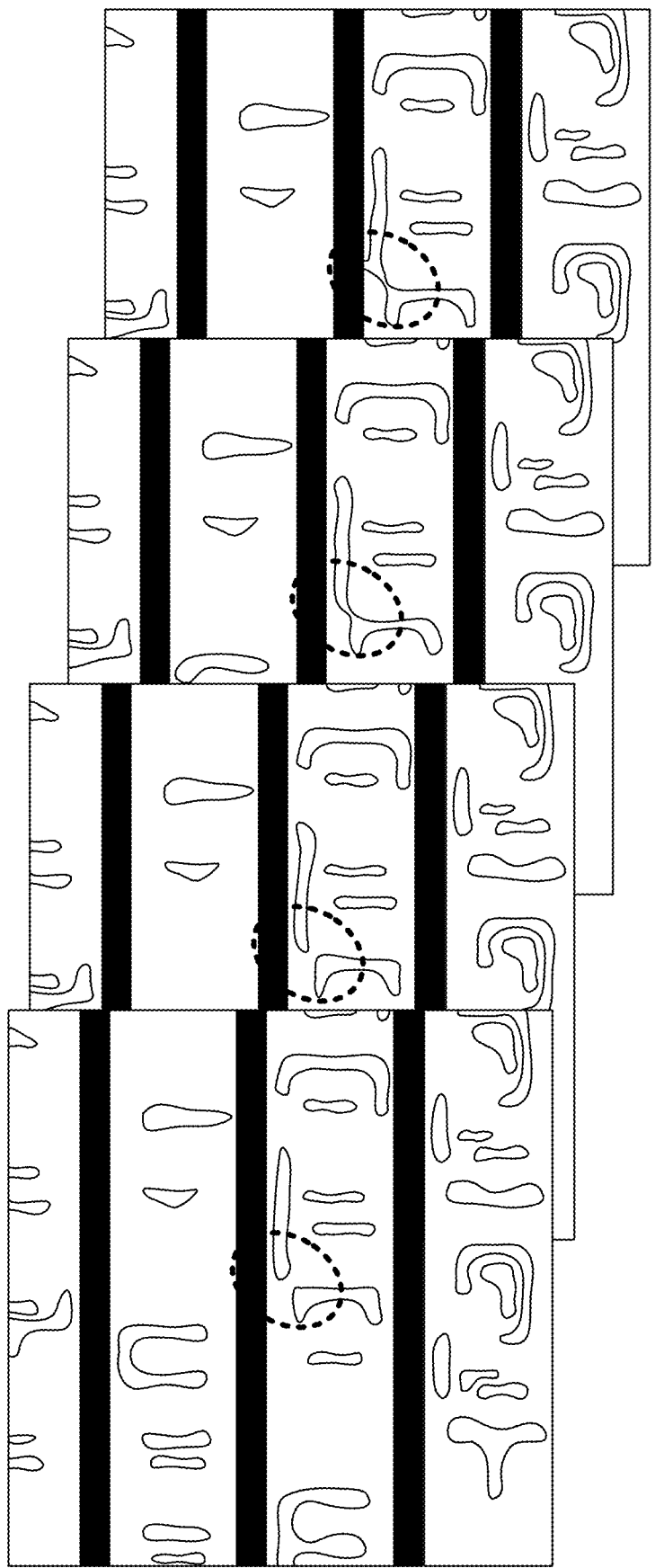
FIG. 5 includes four exemplary images illustrating pattern failure.

FIG. 5 includes four exemplary images illustrating pattern failure. There may be a high propensity for diagonal bridges if the maximum CD is greater than 20 nm. If the maximum CD is from 16 nm to 20 nm, then there may be a smaller propensity for diagonal bridges. The propensity for diagonal bridges may be medium or low if the maximum CD is from 16 nm to 20 nm.

Figure 6:
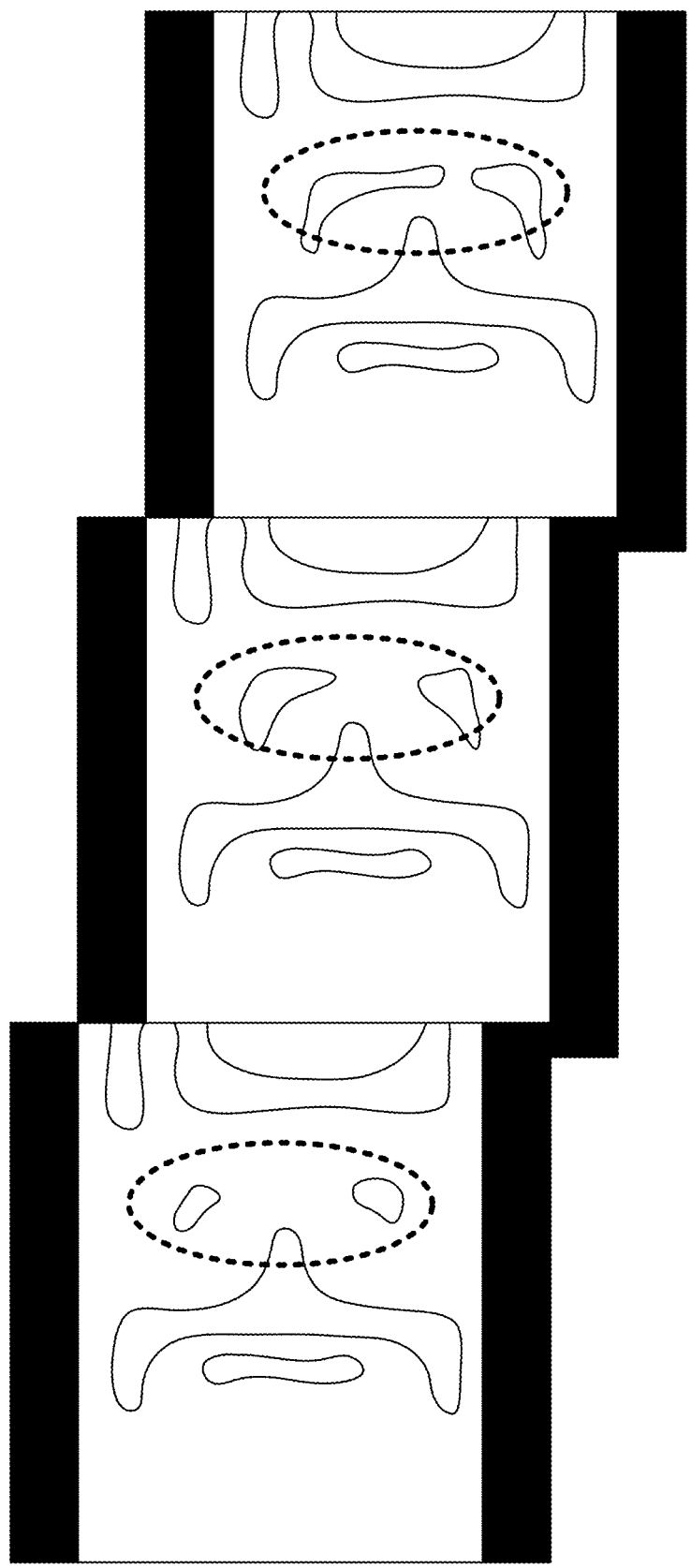
FIG. 6 includes three exemplary images quantifying pattern failure probability.

FIG. 6 includes three exemplary images quantifying pattern failure probability. Dies with a hotspot CD of less than 15 nm have a broken pattern.

Figure 7:
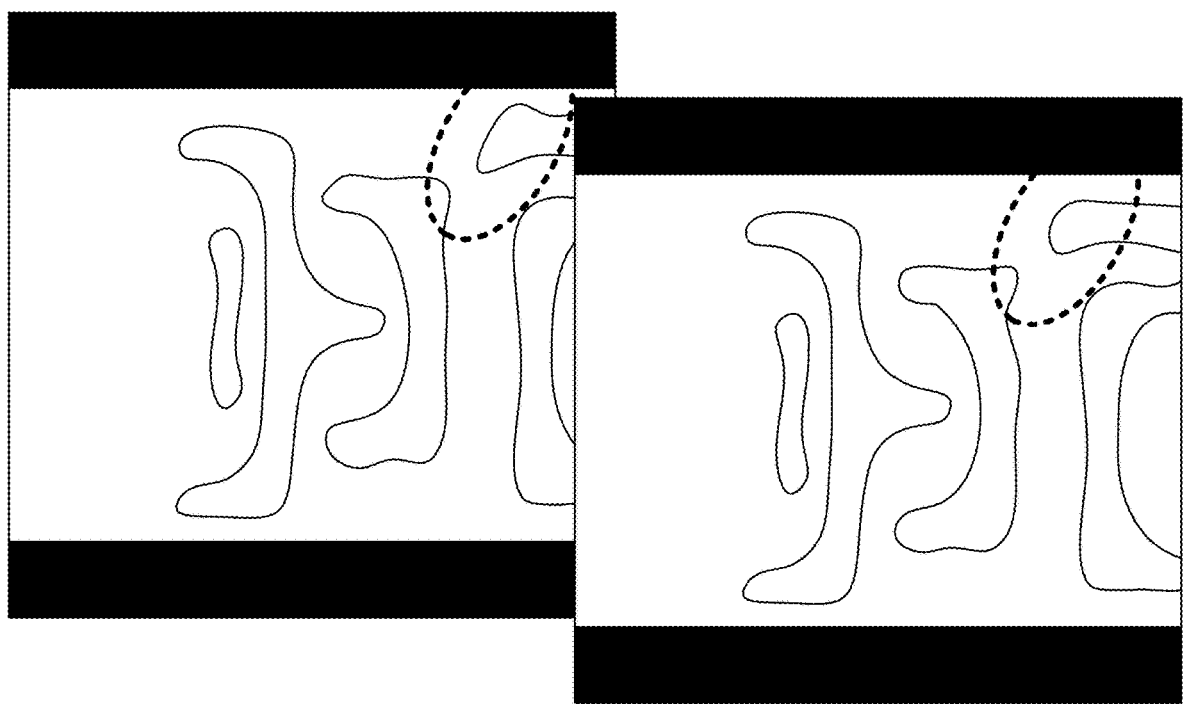
FIG. 7 includes two exemplary images quantifying pattern failure probability.

FIG. 7 includes two exemplary images quantifying pattern failure probability. Dies with a hotspot CD greater than 27 nm have patterns altering the neighboring structures (i.e., proximity effect).

In an example, the time to results for hotspots process window qualification based on quantitative filters enabled by embodiments disclosed herein may be less than 10 minutes.

Machine learning-based defect detection and/or classification platform also can be used with the embodiments disclosed herein. An integrated metrology platform can provide multiple benefits. First, this can enable detection of metrology-based, design-based, or patterning-based defects using the CDU output range in addition to the detection of random process defects. Second, integrating a metrology arm in the training phase of integrated metrology platform can provide an extra parameter to build a mother model for initial defect detection and/or background learning for bootstrapping with initial phases of detection/classification for a new layer. The integrated metrology arm can use critical dimension metrology output as a training attribute of the classifier. The mother model is a generic model that can be used for any new layer or defect type that is being inspected when the defect types to be encountered are not known.

The success of machine learning for defect detection and classification may depend on the pre-training, which is typically a time-consuming manual process. Generic models for machine learning training typically begin with known examples that can be performed to improve the previous techniques. This is called bootstrapping. Once the CDU related attributes have been used in the classification flow and their relationship toward a classification process is known, this can be used in the bootstrapping process to make the starting model CDU-aware.

Figure 8:
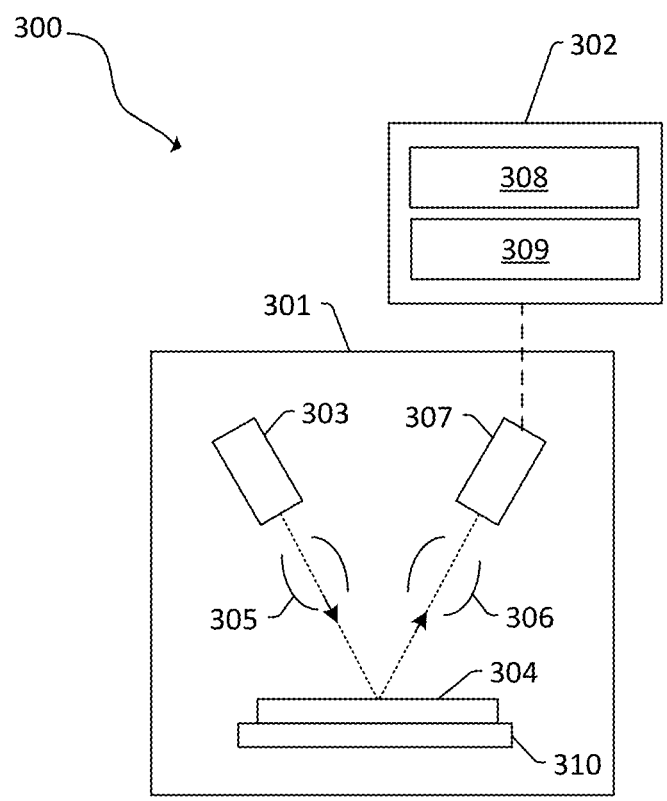
FIG. 8 is an embodiment of a system in accordance with the present disclosure.

FIG. 8 is a block diagram of an embodiment of a system 300. The system 300 includes a wafer inspection tool (which includes the electron column 301) configured to generate images of a wafer 304.

The wafer inspection tool includes an output acquisition subsystem that includes at least an energy source and a detector. The output acquisition subsystem may be an electron beam-based output acquisition subsystem. For example, in one embodiment, the energy directed to the wafer 304 includes electrons, and the energy detected from the wafer 304 includes electrons. In this manner, the energy source may be an electron beam source. In one such embodiment shown in FIG. 8, the output acquisition subsystem includes electron column 301, which is coupled to computer subsystem 302. A stage 310 may hold the wafer 304.

As also shown in FIG. 8, the electron column 301 includes an electron beam source 303 configured to generate electrons that are focused to wafer 304 by one or more elements 305. The electron beam source 303 may include, for example, a cathode source or emitter tip. The one or more elements 305 may include, for example, a gun lens, an anode, a beam limiting aperture, a gate valve, a beam current selection aperture, an objective lens, and a scanning subsystem, all of which may include any such suitable elements known in the art.

Electrons returned from the wafer 304 (e.g., secondary electrons) may be focused by one or more elements 306 to detector 307. One or more elements 306 may include, for example, a scanning subsystem, which may be the same scanning subsystem included in element(s) 305.

The electron column also may include any other suitable elements known in the art.

Although the electron column 301 is shown in FIG. 8 as being configured such that the electrons are directed to the wafer 304 at an oblique angle of incidence and are scattered from the wafer 304 at another oblique angle, the electron beam may be directed to and scattered from the wafer 304 at any suitable angles. In addition, the electron beam-based output acquisition subsystem may be configured to use multiple modes to generate images of the wafer 304 (e.g., with different illumination angles, collection angles, etc.). The multiple modes of the electron beam-based output acquisition subsystem may be different in any image generation parameters of the output acquisition subsystem.

Computer subsystem 302 may be coupled to detector 307 as described above. The detector 307 may detect electrons returned from the surface of the wafer 304 thereby forming electron beam images of the wafer 304. The electron beam images may include any suitable electron beam images. Computer subsystem 302 may be configured to perform any of the functions described herein using the output of the detector 307 and/or the electron beam images. Computer subsystem 302 may be configured to perform any additional step(s) described herein. A system 300 that includes the output acquisition subsystem shown in FIG. 8 may be further configured as described herein.

It is noted that FIG. 8 is provided herein to generally illustrate a configuration of an electron beam-based output acquisition subsystem that may be used in the embodiments described herein. The electron beam-based output acquisition subsystem configuration described herein may be altered to optimize the performance of the output acquisition subsystem as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

Although the output acquisition subsystem is described above as being an electron beam-based output acquisition subsystem, the output acquisition subsystem may be an ion beam-based output acquisition subsystem. Such an output acquisition subsystem may be configured as shown in FIG. 8 except that the electron beam source may be replaced with any suitable ion beam source known in the art. In addition, the output acquisition subsystem may be any other suitable ion beam-based output acquisition subsystem such as those included in commercially available focused ion beam (FIB) systems, helium ion microscopy (HIM) systems, and secondary ion mass spectroscopy (SIMS) systems.

The computer subsystem 302 includes a processor 308 and an electronic data storage unit 309. The processor 308 may include a microprocessor, a microcontroller, or other devices. The processor 308 and/or the electronic data storage unit 309 optionally may be in electronic communication with a wafer inspection tool or a wafer review tool (not illustrated) to receive additional information.

The computer subsystem 302 may be coupled to the components of the system 300 in any suitable manner (e.g., via one or more transmission media, which may include wired and/or wireless transmission media) such that the processor 308 can receive output. The processor 308 may be configured to perform a number of functions using the output. The wafer inspection tool can receive instructions or other information from the processor 308. The processor 308 and/or the electronic data storage unit 309 optionally may be in electronic communication with another wafer inspection tool, a wafer metrology tool, or a wafer review tool (not illustrated) to receive additional information or send instructions.

The processor 308 is in electronic communication with the wafer inspection tool, such as the detector 307. The processor 308 may be configured to process images generated using measurements from the detector 307. For example, the processor may perform embodiments of the method 100 or method 200.

The computer subsystem 302, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool.

The processor 308 and electronic data storage unit 309 may be disposed in or otherwise part of the system 300 or another device. In an example, the processor 308 and electronic data storage unit 309 may be part of a standalone control unit or in a centralized quality control unit. Multiple processors 308 or electronic data storage unit 309 may be used.

The processor 308 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 308 to implement various methods and functions may be stored in readable storage media, such as a memory in the electronic data storage unit 309 or other memory.

If the system 300 includes more than one computer subsystem 302, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 308 may be configured to perform a number of functions using the output of the system 300 or other output. For instance, the processor 308 may be configured to send the output to an electronic data storage unit 309 or another storage medium. The processor 308 may be further configured as described herein.

The processor 308 or computer subsystem 302 may be part of a defect review system, an inspection system, a metrology system, or some other type of system. Thus, the embodiments disclosed herein describe some configurations that can be tailored in a number of manners for systems having different capabilities that are more or less suitable for different applications.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 308 may be configured according to any of the embodiments described herein. The processor 308 also may be configured to perform other functions or additional steps using the output of the system 300 or using images or data from other sources.

The processor 308 may be communicatively coupled to any of the various components or sub-systems of system 300 in any manner known in the art. Moreover, the processor 308 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the processor 308 and other subsystems of the system 300 or systems external to system 300.

Various steps, functions, and/or operations of system 300 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 308 (or computer subsystem 302) or, alternatively, multiple processors 308 (or multiple computer subsystems 302). Moreover, different sub-systems of the system 300 may include one or more computing or logic systems. Therefore, the above description should not be interpreted as a limitation on the present disclosure but merely an illustration.

An additional embodiment relates to a non-transitory computer-readable medium storing program instructions executable on a processor. In particular, a processor, such as the processor 308, can be coupled to a memory in an electronic data storage medium with non-transitory computer-readable medium, such as the electronic data storage medium 309, that includes executable program instructions. The computer-implemented method may include any step(s) of any method(s) described herein. For example, processor 308 may be programmed to perform some or all of the steps of method 100 or the method of FIG. 3. The memory in the electronic data storage medium 309 may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

In an embodiment, one or more programs are included on a non-transitory computer-readable storage medium, such as the electronic data storage medium 309. The one or more programs are for executing steps on one or more computing devices, such as the processor 308. The programs can include receiving an image of a semiconductor wafer with a defect in a bounding box;

classifying the defect in the image as an initial defect type based on the pixels in the image; retrieving critical dimension uniformity parameters associated with the defect type from an electronic data storage unit (e.g., the electronic data storage medium 309); and quantifying a level of defectivity of the defect based on the critical dimension uniformity parameters. The programs also can include obtaining topography attributes and contrast attributes for the defect in the image and classifying the defect based on the topography attributes and the contrast attributes as a final defect type.

The computer subsystem 302 can further include a machine learning module. Classifying defects as the final defect type can use the machine learning algorithm module. The machine learning algorithm module may be stored on the electronic data storage medium 309 and/or run on the processor 308.

In an embodiment, the learning-based model includes a machine learning model. Machine learning can be generally defined as a type of artificial intelligence (AI) that provides computers with the ability to learn without being explicitly programmed. Machine learning focuses on the development of computer programs that can teach themselves to grow and change when exposed to new data. In other words, machine learning can be defined as the subfield of computer science that gives computers the ability to learn without being explicitly programmed. Machine learning explores the study and construction of algorithms that can learn from and make predictions on data. Such algorithms overcome following strictly static program instructions by making data driven predictions or decisions, through building a model from sample inputs.

In one embodiment, the learning-based model includes a deep learning model. Generally speaking, "deep learning" (also known as deep structured learning, hierarchical learning or deep machine learning) is a branch of machine learning based on a set of algorithms that attempt to model high level abstractions in data. In a simple case, there may be two sets of neurons: ones that receive an input signal and ones that send an output signal. When the input layer receives an input, it passes on a modified version of the input to the next layer. In a deep network, there are many layers between the input and output, allowing the algorithm to use multiple processing layers, composed of multiple linear and non-linear transformations.

Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations are better than others at simplifying the learning task (e.g., face recognition or facial expression recognition). One of the promises of deep learning is replacing handcrafted features with efficient algorithms for unsupervised or semi-supervised feature learning and hierarchical feature extraction.

In a further embodiment, the learning-based model includes a neural network. For example, the model may be a deep neural network with a set of weights that model the world according to the data that it has been fed to train it. Neural networks can be generally defined as a computational approach which is based on a relatively large collection of neural units loosely modeling the way a biological brain solves problems with relatively large clusters of biological neurons connected by axons. Each neural unit is connected with many others, and links can be enforcing or inhibitory in their effect on the activation state of connected neural units. These systems are self-learning and trained rather than explicitly programmed and excel in areas where the solution or feature detection is difficult to express in a traditional computer program.

Neural networks typically consist of multiple layers, and the signal path traverses from front to back. The goal of the neural network is to solve problems in the same way that the human brain would, although several neural networks are much more abstract. Modern neural network projects typically work with a few thousand to a few million neural units and millions of connections. The neural network may have any suitable architecture and/or configuration known in the art.

In another embodiment, the learning-based model includes a convolution neural network (CNN). For example, the embodiments described herein can take advantage of deep learning concepts such as a CNN to solve the normally intractable representation conversion problem (e.g., rendering). The model may have any CNN configuration or architecture known in the art.

In a further embodiment, the learning-based model includes a deep neural network. For example, the model may be configured to have a deep learning architecture in that the model may include multiple layers, which perform a number of algorithms or transformations. In general, the number of layers in the model is not significant and is use case dependent. For practical purposes, a suitable range of layers included in the model is from two layers to a few tens of layers. The deep neural network may be otherwise configured as described herein. In one such embodiment, the learning-based model may be configured as a deep CNN (DCNN).

In an additional embodiment, the learning-based model includes a discriminative model. Discriminative models, also called conditional models, are a class of models used in machine learning for modeling the dependence of an unobserved variable y on an observed variable x. Within a probabilistic framework, this is done by modeling the conditional probability distribution P(y x), which can be used for predicting y from x. Discriminative models, as opposed to generative models, do not allow one to generate samples from the joint distribution of x and y. However, for tasks such as classification and regression that do not require the joint distribution, discriminative models can yield superior performance. In contrast, generative models are typically more flexible than discriminative models in expressing dependencies in complex learning tasks. In addition, most discriminative models are inherently supervised and cannot easily be extended to unsupervised learning. Application specific details ultimately dictate the suitability of selecting a discriminative versus generative model. In this manner, the embodiments described herein may use a deep learning network of a discriminative type for the applications described herein (classification or regression purposes).

In some embodiments, the learning-based model includes a generative model. A generative model can be generally defined as a model that is probabilistic in nature. In other words, a generative model is not one that performs forward simulation or rule-based approaches and, as such, a model of the physics of the processes involved in generating actual output (for which simulated output is being generated) is not necessary. Instead, as described further herein, the generative model can be learned (in that its parameters can be learned) based on a suitable training set of data. In this manner, the embodiments described herein may use a deep learning network such as a deep generative network for the applications described herein (classification or regression purposes).

In one embodiment, the learning-based model includes a deep generative model. For example, the model may be configured to have a deep learning architecture in that the model may include multiple layers, which perform a number of algorithms or transformations. In general, the number of layers on one or both sides of the generative model is not significant and is use case dependent. For practical purposes, a suitable range of layers on both sides is from two layers to a few tens of layers.

In another embodiment, the learning-based model is configured for convolution with upsampled filters. For example, the repeated combination of max-pooling and downsampling ("striding") performed at consecutive layers of DCNNs originally designed for image classification may result in feature maps with significantly reduced spatial resolution when the DCNN is employed in a fully convolutional fashion. In order to overcome this hurdle and efficiently produce denser feature maps, the downsampling operator may be removed from the last few max-pooling layers of DCNNs and instead upsample the filters in subsequent convolutional layers, resulting in feature maps computed at a higher sampling rate.

Filter upsampling amounts to inserting holes between nonzero filter taps. This technique has a long history in signal processing, originally developed for the efficient computation of the undecimated wavelet transform. This scheme offers a simple yet powerful alternative to using deconvolutional layers in dense prediction tasks. Compared to regular convolution with larger filters, unsampled filters ("atrous convolution") allows effectively enlarging the field of view of filters without increasing the number of parameters or the amount of computations.

In this manner, the embodiments described herein may be configured for defect detection and identification using machine learning. In particular, in different applications (e.g., defect detection, CAD rendering), the image level analysis may be converted into a pixel level classification problem.

The embodiments described herein may or may not be configured for training the learning-based model(s) described herein. For example, another method and/or system may be configured to generate a trained learning-based model, which can then be accessed and used by the embodiments described herein.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Defects on other objects also may be classified using techniques and systems disclosed herein.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:
1. A method comprising:
receiving, at a processor, an image of a semiconductor wafer with a defect in a bounding box;
classifying, using the processor, the defect in the image as an initial defect type based on pixels in the image;
retrieving, using the processor, critical dimension uniformity parameters associated with the defect type from an electronic data storage unit;
quantifying, using the processor, a level of defectivity of the defect based on the critical dimension uniformity parameters;
obtaining, using the processor, topography attributes and contrast attributes for the defect in the image;
classifying, using the processor, the defect based on the topography attributes and the contrast attributes as a final defect type, wherein classifying as the final defect type uses a machine learning algorithm; and
training the machine learning algorithm with the final defect type and properties of the defect, wherein the properties include a critical dimension attribute.

2. The method of claim 1, further comprising adding properties of the defect and the final defect type to a database, wherein the properties include the topography attributes and the contrast attributes.

3. The method of claim 1, further comprising identifying the defect in the image using the processor.

4. The method of claim 3, wherein the defect is identified using image subtraction with an image of a neighboring die on the semiconductor wafer.

5. The method of claim 3, further comprising drawing the bounding box around the defect using the processor.

6. The method of claim 1, wherein the image is a scanning electron microscope image.

7. A non-transitory computer readable medium storing a program configured to instruct a processor to execute the method of claim 1.

8. A system comprising:
a stage configured to hold a semiconductor wafer;
an electron source that directs electrons at the semiconductor wafer on the stage;
a detector that receives electrons from a surface of the semiconductor wafer on the stage;
an electronic data storage unit; and
a processor in electronic communication with the detector and the electronic data storage unit, wherein the processor is configured to:
receive an image of the semiconductor wafer with a defect in a bounding box;
classify the defect in the image as an initial defect type based on pixels in the image;
retrieve critical dimension uniformity parameters associated with the defect type from the electronic data storage unit;
quantify a level of defectivity of the defect based on the critical dimension uniformity parameters;
obtain topography attributes and contrast attributes for the defect in the image;
classify the defect based on the topography attributes and the contrast attributes as a final defect type, wherein the defect is classified as the final defect type using a machine learning algorithm; and
training the machine learning algorithm with the final defect type and properties of the defect, wherein the properties include a critical dimension attribute.

9. The system of claim 8, wherein the system further comprises a machine learning module, and wherein classifying as the final defect type uses the machine learning algorithm module.

10. The system of claim 8, wherein the processor is further configured to identify the defect in the image.

11. The system of claim 8, wherein the processor is further configured to draw the bounding box around the defect.

\* \* \* \* \*